T. L. BURTON.
CLASP BRAKE RIGGING.
APPLICATION FILED SEPT. 14, 1916.
1,240,819.
Patented Sept. 25, 1917.
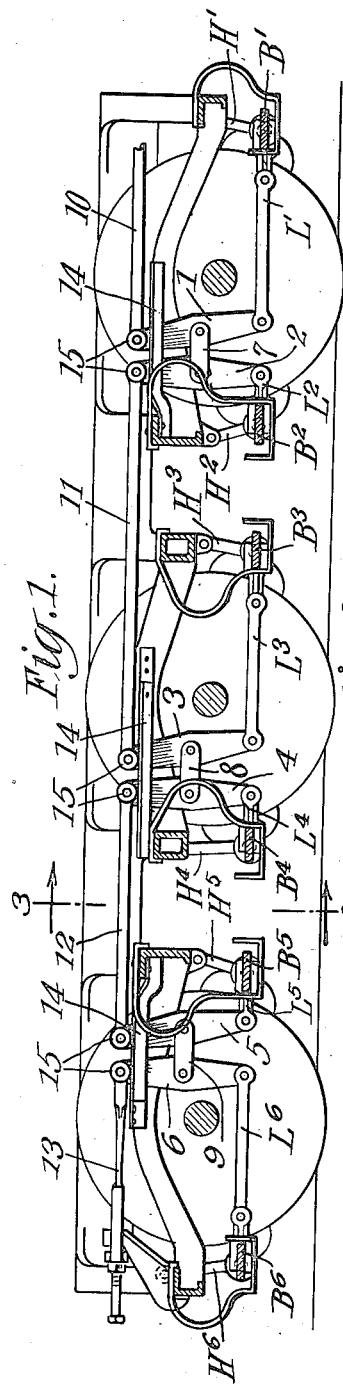
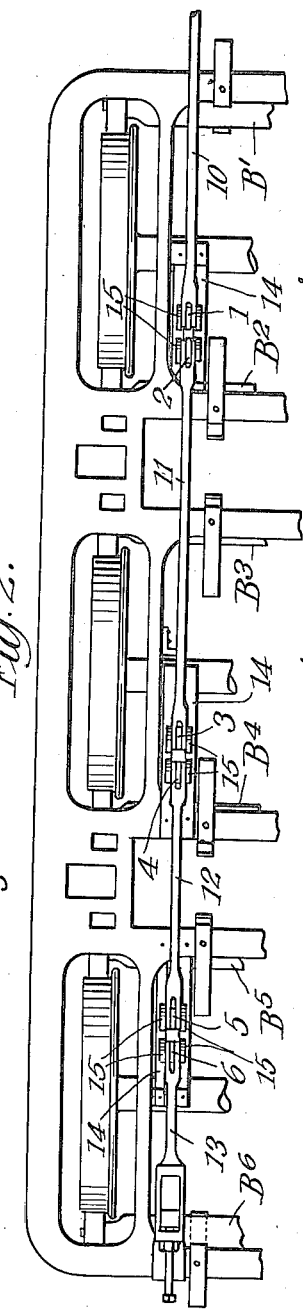
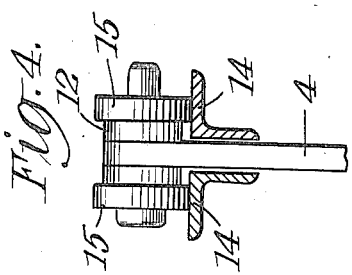
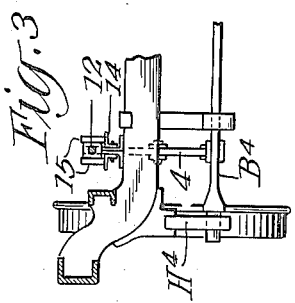
INVENTOR.
Thomas L. Burton
BY Edward Wright
ATTORNEY

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

CLASP BRAKE-RIGGING.

1,240,819.   Specification of Letters Patent.   Patented Sept. 25, 1917.

Application filed September 14, 1916. Serial No. 120,055.

*To all whom it may concern:*

Be it known that I, THOMAS L. BURTON, a citizen of the United States, residing at St. Louis, in the State of Missouri, have invented a certain new and useful Improvement in Clasp Brake-Rigging, of which improvement the following is a specification.

This invention relates to foundation brake rigging of the clasp type, that is, in which brake shoes and beams are applied to both sides of each pair of wheels, and it is particularly designed for use with a six wheeled truck where a double set of truck levers and rods are employed, one set at either side of the truck.

One of the objects of my present invention is to provide an improved rigging of this character, in which the truck levers are located close together in pairs upon one side of each axle, and another object is to provide improved means for supporting said truck levers and rigging.

In the accompanying drawing: Figure 1 is a longitudinal sectional view showing a form of rigging embodying my improvement as applied to a six wheeled truck; Fig. 2, a half plan view of the same; Fig. 3, a transverse section taken on the line 3—3 of Fig. 1; and Fig. 4, a transverse section taken upon a larger scale and showing the rollers and supporting guides for the upper end of one of the truck levers.

According to the preferred construction, the improvement is shown as applied to a six wheeled truck having brake beams, $B^1$, $B^2$, $B^3$, $B^4$, $B^5$ and $B^6$, carrying brake heads and shoes at their ends, and located at both sides of each pair of wheels, with a double set of vertical truck levers, 1, 2, 3, 4, 5, 6, one set at each side of the truck, said levers being arranged in pairs, and the levers of each pair being located at one side of each axle, and in close proximity to each other. The levers of each pair are coupled at their intermediate points by the respective links, 7, 8 and 9, while their lower ends are pivotally connected to the respective brake beams by suitable link connections, $L^1$, $L^2$, $L^3$, $L^4$, $L^5$ and $L^6$. To the upper ends of the truck levers at one end of the truck, such as levers, 1, are attached pull rods, 10, one on each side of the truck, only one being shown in the drawing, and these rods are designed to be connected by a cross equalizer, not shown, as will be readily understood. The upper ends of levers, 2 and 3, are coupled by pull rod, 11, while levers, 4 and 5, are joined by the rod, 12, and the upper end of lever, 6, at the opposite end of the truck is fastened by the rod, 13, to a fixed fulcrum upon the truck frame, or attached to the usual slack adjuster for taking up the wear in the brake shoes and rigging.

The pairs of truck levers are preferably located at opposite sides of the car axles, that is, the pairs of truck levers for the wheels at opposite ends of the truck are both placed upon the inner side of their respective axles with reference to the truck, and for supporting this system of levers, the upper ends of the levers may pass between the supporting guide bars, 14, mounted on the truck frame. The connecting pins at the upper ends of these levers may also be provided with the rollers, 15, bearing upon the guide bars for reducing the friction of movement of the upper ends of said levers along the guides. The brake shoes may also be provided with the usual hangers, $H^1$, $H^2$, $H^3$, $H^4$, $H^5$ and $H^6$, pivotally attached to the truck frame.

When the power is applied to the pull rod, 10, the upper end of live lever, 1, slides readily upon the guides, and transmits the movement through the lever and rod system in tandem to the dead truck lever, 6, having its fulcrum fixed at the end of rod, 13, the force being applied to all the brake beams whereby the brake shoes engage the wheels with equalized pressure throughout. The upper ends of the levers are supported by means of the rollers upon the guide bars and move thereon with very little or no friction. By the location of the levers in pairs with the levers of each pair close together, a single pair of guide bars may readily support a pair of truck levers, thus forming a simple and compact structure, and one which may be readily applied to certain forms of truck frames.

Having now described my invention, what I claim as new and desire to secure by Letters Patent is:

1. In a brake rigging for railway trucks having a plurality of pairs of wheels, the combination with brake beams applied to both sides of each pair of wheels, of a truck lever for each brake beam, said levers being arranged in pairs and both levers of each pair located at one side of the respective axle, and links and pull rods for connecting said levers.

2. In a brake rigging for railway trucks having a plurality of pairs of wheels, the combination with brake beams applied to both sides of each pair of wheels, of a double set of truck levers pivotally connected to said brake beams, one set at each side of the truck, the truck levers of each set being arranged in pairs and both levers of each pair being located at one side of the respective axle, and pull rod connections for said levers.

3. In a brake rigging for railway trucks having a plurality of pairs of wheels, the combination with brake beams applied to both sides of each pair of wheels, of a truck lever pivotally connected at its lower end to each brake beam, said levers arranged in pairs with both levers of each pair located at one side of the respective axle, links connecting the levers of each pair at an intermediate point, and pull rods connecting the upper ends of said levers between the respective pairs.

4. In a brake rigging for six wheeled trucks, the combination with brake beams applied to both sides of each pair of wheels, of a truck lever pivotally connected to each brake beam, said levers arranged in pairs with both levers at the two end pairs of wheels located inside the respective axles, and links and pull rods for connecting said levers.

5. In a brake rigging for six wheeled trucks, the combination with brake beams applied to both sides of each pair of wheels, of a double set of truck levers pivotally connected to the brake beams, one set at each side of the truck, the truck levers of each set being arranged in pairs with both levers of each pair located on the same side of the respective axle, the pairs at the opposite ends of the truck being disposed at the inner side of their axles, and pull rod connections for said levers.

6. In a brake rigging for railway trucks having a plurality of pairs of wheels, the combination with brake beams applied to both sides of each pair of wheels, of a vertical truck lever pivotally connected to each brake beam, said levers being arranged in pairs, guide bars supporting the upper ends of said levers, and links and pull rods for connecting said levers.

7. In a brake rigging for railway trucks having a plurality of pairs of wheels, the combination with brake beams applied to both sides of each pair of wheels, of a vertical truck lever pivotally connected to each brake beam, said levers being arranged in pairs, both levers of each pair being located close together at one side of the respective axle, guide bars supporting the upper ends of each pair of levers, and links and pull rods for connecting said levers.

8. In a brake rigging for railway trucks having a plurality of pairs of wheels, the combination with brake beams applied to both sides of each pair of wheels, of a vertical truck lever pivotally connected to each brake beam, said levers being arranged in pairs, guide bars at the upper ends of said levers, rollers mounted on the levers and supported on said bars, and pull rod connections for said levers.

In testimony whereof I have hereunto set my hand.

THOMAS L. BURTON.